Jan. 4, 1966 J. R. OWEN 3,228,017

TAPE RECORDING APPARATUS WITH COORDINATION OF RECORDING CARRIER FREQUENCY AND SELECTED MEDIUM SPEED

Filed Oct. 3, 1962

INVENTOR.
JAMES R. OWEN

BY Arthur H. Swanson

ATTORNEY.

United States Patent Office 3,228,017

Patented Jan. 4, 1966

3,228,017

TAPE RECORDING APPARATUS WITH CO-ORDINATION OF RECORDING CARRIER FREQUENCY AND SELECTED MEDIUM SPEED

James R. Owen, Littleton, Colo., assignor to Honeywell Inc., a corporation of Delaware Filed Oct. 3, 1962, Ser. No. 228,184
8 Claims. (Cl. 340—174.1)

This invention relates to magnetic tape recording. More specifically, the present invention relates to frequency modulated magnetic tape recording.

An object of the present invention is to provide an improved frequency modulated magnetic tape recording apparatus.

Another object of the present invention is to provide an improved frequency modulated magnetic tape recording apparatus characterized by a coordination of a recording carrier frequency and a selected speed of the recording medium.

A further object of the present invention is to provide an improved frequency modulated magnetic recording apparatus having an improved switching circuit for simultaneously selecting a recording carrier frequency and a desired speed of the recording medium in accordance with a predetermined program.

Still another object of the present invention is to provide an improved frequency modulated recording apparatus with a coordinated recording carrier frequency and speed of the recording medium.

A still further object of the present invention is to provide an improved tape recording apparatus having means for selecting and controlling a recording medium speed.

Still another further object of the present invention is to provide an improved frequency modulated recording apparatus, as set forth herein, having a simplified operation and construction.

In accomplishing these and other objects, there has been provided in accordance with the present invention, a recording apparatus having a switching circuit for effecting a simultaneous selection of recording carrier frequency for frequency modulation recording and a coordinated speed of the recording medium. The selected recording carrier frequency is applied to a recording head. The selection of the recording medium speed is used to control the speed of a capstan motor by a feed-back control circuit for sensing the capstan motor speed. A novel switching circuit means is used to perform both selection operations whereby to coordinate the carrier frequency with the speed of the recording medium in accordance with a predetermined program.

A better understanding of the present invention may be had from the following detailed disclosure when read with reference to the attached drawings, in which.

Figure 1:
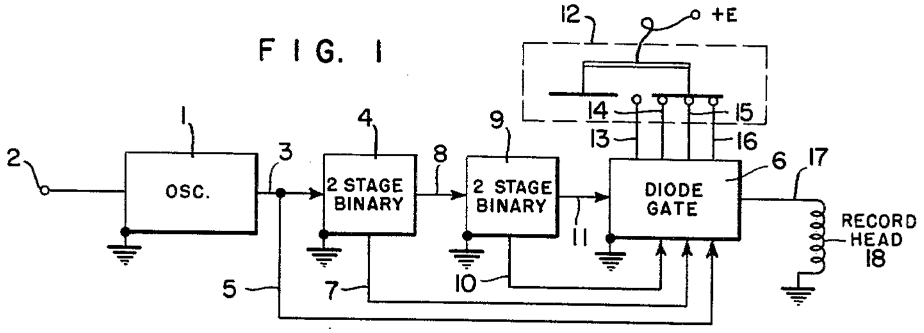
FIG. 1 is a schematic illustration of a frequency modulated recording apparatus embodying the present invention.
Figures 3, 4:
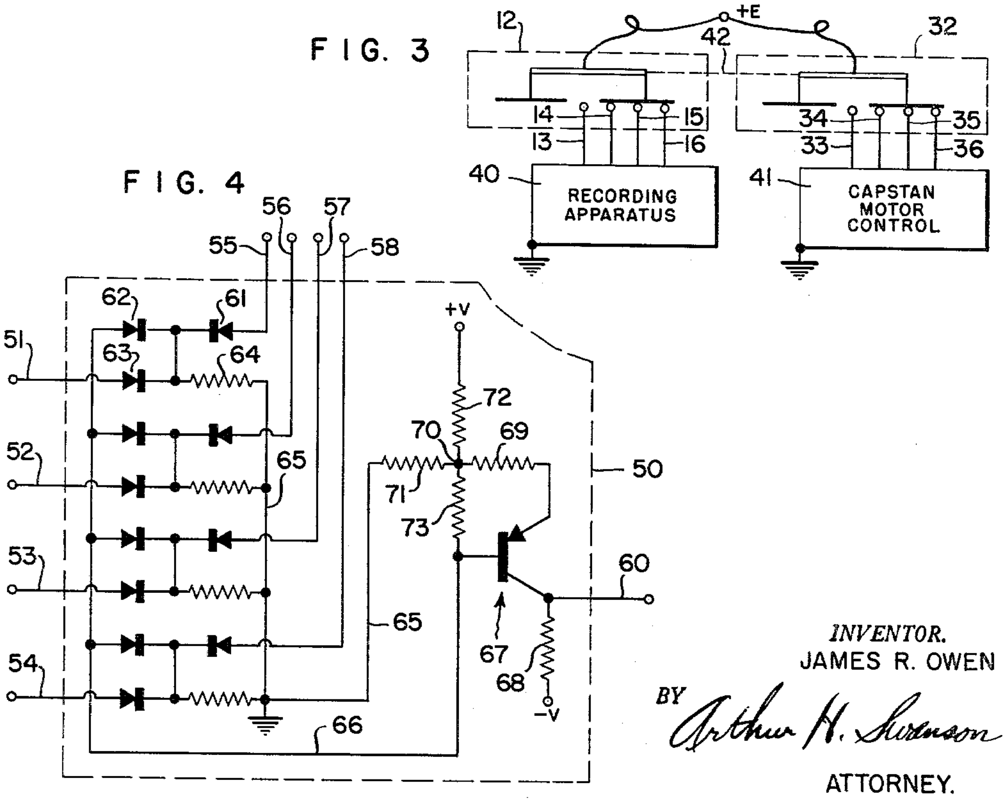
FIG. 3 is a block diagram of a tape recording apparatus utilizing the novel circuits shown in FIGS. 1 and 2.
FIG. 4 is a schematic diagram of a novel diode gate circuit suitable for use with the apparatus shown in FIG. 1 and FIG. 2.

Referring to FIG. 1 in more detail, there is shown a tape recording apparatus utilizing a frequency modulation recording technique and embodying the present invention. The apparatus shown in FIG. 1 comprises a recording oscillator 1 connected to an input signal terminal 2. The oscillator 1 is arranged to produce a frequency modulated output signal on an output line 3 in response to variations in an input signal applied to the input terminal 2. The frequency modulated output signal is applied to a two-stage binary circuit 4 which may comprise a pair of flip-flop circuits. This output signal is also applied along line 5 to diode gate circuit 6, which is described in detail hereinafter and is shown in FIG. 4.

The binary circuit 4 is effective to perform a frequency division by producing a first output signal for each two input signals and a second output signal for each four input signals. In other words, the frequency of the output signal from the first stage of the binary circuit 4 is half of the frequency of the output signal from the oscillator 1. Similarly, the frequency of the output signal from the second stage of the binary circuit 4 is half of the frequency of the output signal from the first stage of the binary circuit 4 which is the same as one-quarter of the frequency of the oscillator 1. The one-half frequency signal is applied along line 7 to the diode gate 6. The one-quarter frequency signal is applied along line 8 to another two-stage binary circuit 9 for further frequency division. The two output signals from the second binary circuit 9 are one-eighth and one-sixteenth of the frequency of the oscillator 1 and are applied lines 10 and 11, respectively, to the diode gate 6.

A switch means 12 is used to selectively remove a potential "E" from one of four diode gate control lines 13, 14, 15, and 16 connected to the diode gate 6. The diode gate 6 is, thus, controlled by the switch 12 to selectively apply one of the subdivided frequency modulated signals, discussed above, as applied on input lines 5, 7, 10, and 11, to an output line 17 for use as an energizing signal for a record head 18. Thus, the frequency modulated output signal from the oscillator 1 is applied to the record head 18 in a frequency range selected by the diode gate 6.

Figure 2:
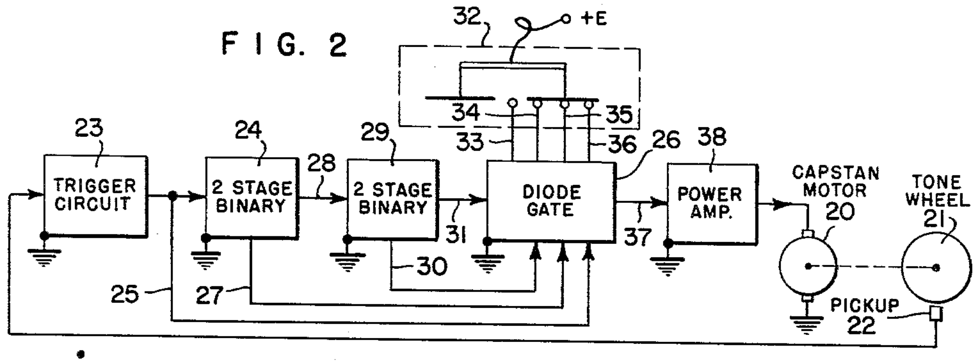
FIG. 2 is a schematic illustration of a tape recording apparatus also embodying the present invention.

Referring now to FIG. 2, there is shown a tape transport control system also embodying the present invention. The apparatus shown in FIG. 2 is used to control a capstan motor 20 which is used to drive a recording tape. A tone wheel 21 and pickup 22 are used to sense the speed of the capstan motor 20 by generating a frequency modulated output signal representative of the rotational speed of the tone wheel 21. This frequency modulated signal is applied to a trigger circuit 23 to produce a sequence of pulses occurring at the frequency of the signal generated by the tone wheel 21. This frequency modulated train of pulses is applied to a two-stage binary circuit 24 similar to that discussed above as binary circuit 4. The pulses are also applied along a line 25 to a diode gate circuit 26, similar to the gate circuit 6, shown in FIG. 1 and discussed above.

The purpose of the binary circuit 24 is to subdivide the frequency of the incoming pulses. Acordingly, the output signals from the binary circuit 24 are a pulse train having a frequency of one-half that of the output from the trigger circuit 23 and a pulse train having a frequency of one-quarter that of the input pulses. The one-half frequency signal is applied along line 27 to the diode gate 26. The one-quarter frequency signals are applied along a line 28 to a second binary circuit 29. The further frequency subdivision of the second binary circuit 29 is effective to produce a one-eighth and a one-sixteenth frequency train of pulses, with relation to the output signal from the trigger circuit 23, which are applied along lines 30 and 31, respectively, to the diode gate 26.

A switch 32 is used to selectively remove an energizing potential "E" from one of a plurality of diode gate control lines 33, 34, 35, and 36. This selective removal of an energizing potential from the diode gate 26 is effective to apply one of the frequency modulated input signals, applied on input lines 25, 27, 30, and 31, along a line 37 power amplifier 38. The power amplifier 37 is arranged to drive and to control the capstan motor 20 at a speed determined by the frequency of the input signal applied to the amplifier 37. Thus, the switch 32 is used to select a desired speed of the capstan motor 20 to produce an equivalent speed of the recording medium; e.g., seven and one-half inches per second. Since the selected frequencies represent submultiples of a main frequency, it may be noted that the resulting recording medium speeds will be corresponding multiples of a basic speed; e.g., 3¾, 7½, 15, etc.

In FIG. 3, there is shown a combined recording apparatus and tape transport control embodying the present invention. The recording apparatus 40 is substantially identical with the circuit shown in FIG. 1 with the switch 12 shown separately. Similarly, the motor control 41 is similar to the circuit shown in FIG. 2 with the switch 32 shown separately. A linkage 42 is used to mechanically link the switches 40 and 41 to provide a simultaneous selection of recording medium speed and frequency of recording. Thus, the speed of the recording medium is coordinated with the recording frequency to provide the most efficient combination. In general, an increased record speed would be used with an increased recording frequency and vice versa. The combined movement of switches 12 and 32 would control the circuits 40 and 41, as described above, to simultaneously select a recording frequency and a suitable record medium speed.

A diode gate 50 suitable for use either as the diode gate 6, shown in FIG. 1, or the diode gate 26, shown in FIG. 2, is shown in FIG. 4. The diode gate 50 has four input lines 51, 52, 53, and 54 and four control lines 55, 56, 57, and 58. The input lines 5, 7, 10, and 11, shown in FIG. 1, and the input lines 25, 27, 30, and 31, shown in FIG. 2, correspond, respectively, to the input lines 51, 52, 53, and 54, shown in FIG. 4. Similarly, the control lines 13, 14, 15, and 16, shown in FIG. 1, and the control lines 33, 34, 35, and 36, shown in FIG. 2, correspond, respectively, to the control lines 55, 56, 57, and 58 shown in FIG. 4. The diode gate 50 has a single output line 60 which line corresponds to the output line 17, shown in FIG. 1, and the output line 37, shown in FIG. 2, respectively.

As previously described, a switch means is used to selectively remove a control potential "E" from the control lines of the diode gate. Thus, all of the control lines 55, 56, 57, and 58 except a selected line will have a potential "E" applied thereto. The control lines are each connected to similar diode circuits for controlling the transmission of an input signal to the output line 60.

The following discussion is specifically directed to the control effect of control line 55 upon the respective input line 51 but is equally applicable to the other combinations of control lines and respective input lines of the diode gate 50. The control line 55 is connected to the anode of a first diode 61. The cathode of the diode 61 is connected to the cathodes of a second diode 62, a cathode of a third diode 63, and one end of a resistor 64. The anode of the third diode 63 is connected to the input line 51. The other end of the resistor 64 is connected to a ground line 65. The anode of the second diode 62 is connected by a line 66 to a transistor amplifier circuit including a transistor 67. The collector electrode of the transistor 67 is connected to the output line 60, and, through an output resistor 68, to a source of negative potential "—V." The emitter electrode is connected through an emitter resistor 69 to a junction 70. The junction 70 is connected to the ground line 65 through a voltage dividing resistor 71 and to a positive potential source "+V" through a resistor 72. The line 66 from the second diode 62 is connected to the base electrode of the transistor 67 and through an isolating resistor 73 to the junction 70.

In operation, the diode gate 50 is effective to selectively provide a conducting path between one of the input lines 51, 52, 53, and 54 and the output line 60. The transistor 67 is used to amplify the selected input signal before application to the output line 60. The selection operation is effected by removing a control potential from a desired control line while retaining the potential on the other control lines. In the configuration of the diodes shown in FIG. 4, the applied control potential is a positive polarity potential. The input signals applied to lines 51, 52, 53, and 54 are also positive polarity potentials having the same magnitude as the aforesaid control potentials applied to the control lines 55, 56, 57, and 58.

Assume a control potential is applied to control line 55 and an input signal is applied to input line 51. The positive control signal is effective to bias the diode 61 into a conducting state with the resulting current flowing through the resistor 64. The control potential, accordingly, appears across the resistor 64 with a polarity which opposes the input signal on line 51. Further, since the input signal and the control signal have substantially the same magnitude, the diode 63 is biased into a non-conducting state.

The control potential appearing across the resistor 64 is also applied to the cathode of the second diode 62. The potential on the anode of the diode 62 is derived from a voltage division of the source "+V" across the resistors 72 and 71. A fixed portion of this voltage division appearing at junction 70 is applied to the diode 62. This positive voltage is arranged to have a lower magnitude than the positive control voltage appearing across the resistor 64. Thus, the diode 62 is, also, biased into a non-conducting state. Accordingly, the input signal from line 51 is blocked from appearing on line 66 and the base electrode of transistor 67.

In order to select the input signal on line 51, the control signal is removed from line 55. This action is effective to bias the diode 61 into a non-conducting state and to allow conduction of the input signal through diode 51 and resistor 64. Since this input signal is a frequency modulated alternating current signal, the voltage across the resistor 64 will be an alternating current signal having a varying amplitude. The positive bias potential applied to the diode 62 is arranged to have a level lower than the maximum amplitude of the voltage across resistor 64. Thus, for input signal amplitudes above this bias potential, the diode 62 remains in a non-conducting condition. When the input signal amplitude falls below this bias potential, the diode 62 is biased into conducting state, and the input signal appearing across the resistor 64 is applied to the transistor 67. Thus, the diode 62 limits the maximum amplitude of the signal applied to the transistor 67 while permitting lower amplitudes with the frequency modulation information to be applied to the transistor 67. The selected input signal applied to the base electrode of the transistor 67 is amplified and applied to the output line 60.

Thus, it may be seen that there has been presented in accordance with the present invention, a frequency modulated tape recording apparatus characterized by a simultaneous coordination of the recording carrier frequency with the speed of the recording means while affording a selection and control of the recording medium speed.

What is claimed is:

1. A recording apparatus comprising an oscillator operative to produce a frequency modulated signal in response to variations in an input signal applied thereto, means operative to convert the frequency modulated output signal into a plurality of separate output signals having differing frequency ranges, and switching means operative to select one of the output signals for application to a recording head, said switching means comprises a plurality of selection circuits, switch means supplying a plurality of control signals to respective selection circuits whereby each of said selection circuits is selectively connected to a corresponding one of the plurality of control signals, said control signals having the same polarity and amplitude as the output signals from said means operative to subdivide, said selection circuits each comprising a first diode element, a second diode element, a third diode element, one similar electrode from each of said diode elements being connected to a common junction point, impedance means connecting said junction point to a ground terminal, first circuit means connecting a free electrode of said first diode element to a control signal from said switch means, second circuit means connecting a free electrode of said second diode element to one of the output signals from said means operative to subdivide, a selection circuit output terminal, third circuit means connecting a free electrode of said third diode element to said output terminal, and bias means connected to said third circuit means for forwardly biasing said third diode element with a bias signal having the same polarity as the level of the output signal connected to said second diode element and the control signal from said switch means but having a substantially lower magnitude therefrom.

2. A tape transport apparatus comprising sensing means operative to produce a frequency modulated signal representative of the speed of a recording medium, means operative to convert the frequency modulated signal into a plurality of output signals having differing frequency ranges, drive means for driving a recording medium, and switching means operative to select one of the output signals for application to said drive means to determine the speed of the recording means, said switching means comprises a plurality of selection circuits, switch means supplying a plurality of control signals to respective selection circuits whereby each of said selection circuits is selectively connected to a corresponding one of the plurality of control signals, said control signals having the same polarity and amplitude as the output signals from said means operative to subdivide, said selection circuits each comprising a first diode element, a second diode element, a third diode element, one similar electrode from each of said diode elements being connected to a common junction point, impedance means connecting said junction point to a ground terminal, first circuit means connecting a free electrode of said first diode element to a control signal from said switch means, second circuit means connecting a free electrode of said second diode element to one of the output signals from said means operative to subdivide, a selection circuit output terminal, third circuit means connecting a free electrode of said third diode element to said output terminal, and bias means connected to said third circuit means for forwardly biasing said third diode element with a bias signal having the same polarity as the level of the output signal connected to said second diode element and the control signal from said switch means but having a substantially lower magnitude therefrom.

3. A recording device comprising an oscillator operative to produce a frequency modulated recording signal in response to variations in an input signal applied thereto, means operative to subdivide the frequency modulated recording signal into a plurality of output signals having differing frequency ranges and each of said output signals being representative of said input signal, first switching means operative to select one of the output signals for application to a recording head, sensing means operative to produce a frequency modulated drive signal representative of the speed of a tape recording medium, second means operative to subdivide the frequency modulated drive signal into a plurality of output signals having differing frequency ranges, drive means for driving a recording medium at a speed corresponding to an applied drive signal, second switching means operative to select one of the output signals from said second means operative to subdivide for application to said drive means as a drive signal to determine the speed of the recording medium, and means for simultaneously operating said first and second switching means according to a predetermined program.

4. A recording device as set forth in claim 3 wherein each of said switching means comprises a plurality of selection circuits, switch means supplying a plurality of control signals to respective selection circuits whereby each of said selection circuits is selectively connected to a corresponding one of the plurality of control signals, said control signals having the same polarity and amplitude as the output signals from said means operative to subdivide, said selection circuits each comprising a first diode element, a second diode element, a third diode element, one similar electrode from each of said diode elements being connected to a common junction point, impedance means connecting said junction point to a ground terminal, first circuit means connecting a free electrode of said first diode element to a control signal from said switch means, second circuit means connecting a free electrode of said second diode element to one of the output signals from said means operative to subdivide, a selection circuit output terminal, third circuit means connecting a free electrode of said third diode element to said output terminal, and bias means connected to said third circuit means for forwardly biasing said third diode element with a bias signal having the same polarity as the level of the output signal connected to said second diode element and the control signal from said switch means but having a substantially lower magnitude therefrom.

5. A switching means comprising a plurality of selection circuits, switch means supplying a plurality of control signals to respective selection circuits whereby each of said selection circuits is selectively connected to a corresponding one of the plurality of control signals, said selection circuits each comprising a first diode element, a second diode element, a third diode element, one similar electrode from each of said diode elements being connected to a common junction point, impedance means connecting said junction point to a ground terminal, first circuit means connecting said first diode element to a control signal from said switch means, an input terminal, second circuit means connecting a free electrode of said second diode element to said input terminal, a switching means output terminal, third circuit means connecting a free electrode of said third diode element to said output terminal, and bias means connected to said third circuit means for forwardly biasing said third diode element with a bias signal having a predetermined polarity and magnitude with respect to the control signal from said switch means and the input signal to said switching means.

6. A recording apparatus comprising recording means operative to select a carrier frequency for frequency modulation recording from a plurality of available carrier frequencies, recording medium transport means, transport control means operative to select an operating frequency from a plurality of available frequencies to control the speed of said transport means and means for simultaneously coordinating the operation of said recording means and said control means to effect a selection of a carrier frequency and an appropriate operating frequency whereby the speed of said transport means is concurrently coordinated with a suitable recording carrier frequency.

7. A recording device comprising an oscillator operative to produce a frequency modulated recording signal in response to variations in an input signal applied thereto, first means operative to subdivide said recording signal into a plurality of separate output signals having differing frequency ranges each of said output signals being representative of said input signal, first switching means operative to select one of said output signals for application to a recording head, sensing means operative to produce a frequency modulated drive signal representative of the speed of a recording medium, second means operative to convert the frequency modulated drive signal into a plurality of separate output signals having differing frequency ranges, drive means for driving said recording medium at a speed corresponding to an applied drive signal, second switching means operative to select one of said output signals from said second means operative to convert for application to said drive means as a drive signal to determine the speed of said recording medium, and means for simultaneously operating said first and second switching means to select coordinated signals for said drive means and said recording head.

8. A recording device as set forth in claim 7 wherein said first and second means are operative to convert their respective input signals into output signals having frequency ranges that are arranged in integral steps.

References Cited by the Examiner

UNITED STATES PATENTS

| | | | |
|---|---|---|---|
| 2,668,283 | 2/1954 | Mullin | 179—100.2 |
| 2,685,079 | 7/1954 | Hoeppner | 179—100.2 |
| 2,812,510 | 11/1957 | Schulz | 179—100.2 |
| 2,840,800 | 6/1958 | Chester | 340—174.1 |
| 2,854,526 | 9/1958 | Morgan | 340—174.1 |
| 2,866,143 | 12/1958 | Maxwell | 340—174.1 |
| 2,904,682 | 9/1959 | Rawlins | 179—100.2 |
| 3,071,644 | 1/1963 | Olive | 340—174.1 |

OTHER REFERENCES

Schultheis: Frequency-Code Telemetering System, Electronics, April 1954, pp. 172–176.

IRVING L. SRAGOW, *Primary Examiner.*